United States Patent [19]

Weggel

[11] Patent Number: 5,718,750

[45] Date of Patent: Feb. 17, 1998

[54] SAND COMPOSITION HAVING IMPROVED ADHESION

[76] Inventor: Craig R. Weggel, 311 Quigley Ave., Willow Grove, Pa. 19090

[21] Appl. No.: 637,299

[22] Filed: Apr. 24, 1996

[51] Int. Cl.[6] .................... C09D 103/02; C09D 189/00; C08L 3/02; C08L 89/00

[52] U.S. Cl. .................... 106/134.2; 106/157.7; 106/217.1; 106/217.3

[58] Field of Search .............. 106/134.2, 157.7, 106/217.3, 217.1

[56] References Cited

U.S. PATENT DOCUMENTS

| | | | |
|---|---|---|---|
| 17,732 | 7/1857 | Gage et al. | 106/157.7 |
| 281,212 | 7/1883 | Watkins | 106/134.2 |
| 348,644 | 9/1886 | Turley | 106/134.2 |
| 1,239,032 | 9/1917 | Noll | 106/134.2 |
| 2,977,236 | 3/1961 | Neukom | 106/217.3 |
| 4,143,022 | 3/1979 | Iyer . | |

OTHER PUBLICATIONS

CA 122:215889, Kuznetsov et al, "Silica-containing . . . ", Jun. 15 1993.

CA 113:10654, Shi, "Sugar Solution . . . ", Jan. 18, 1989.

CA 104:114398, Kutej et al., "Foundry mixture for mold", Oct. 15, 1985.

*Primary Examiner*—David Brunsman
*Attorney, Agent, or Firm*—William H. Eilberg

[57] ABSTRACT

An additive substantially improves the adhesion of ordinary sand. The additive includes gelatin, flour or starch. The additive may also include salt, colored sand, and/or white sand. In use, one adds water to the additive, forming the additive into a homogeneous, sticky paste. Then, one combines the paste with ordinary sand, again mixing the paste with the sand to produce a homogeneous mixture. The result is a sand-based composition having improved adhesion, and which therefore can be used to make semi-permanent sand castles or other sculptures.

16 Claims, No Drawings

SAND COMPOSITION HAVING IMPROVED ADHESION

BACKGROUND OF THE INVENTION

The present invention relates to a sand-based composition having enhanced cohesion among individual sand granules. The invention comprises an additive which, when added to ordinary sand, produces a cohesive composition which increases the entertainment value of sand sculpting. The additive of the present invention alters both the texture and the adhesion properties of ordinary sand.

For many years, people have been building sand castles at the beach. It is well-known, to those who have built such sand castles, that there is a limit to the size and shape of the sand castles, due to the limit of adhesion of wet sand. For example, when ordinary wet beach sand, or sandbox sand, is piled at a steep angle with respect to the surface of the earth, the compression force due to the sand's own weight exceeds the capability of the individual sand granules to maintain adhesion. The result is that the pile crumbles.

Thus, a need has arisen for a sand-based composition offering the property of increased sand granule adhesion. By providing an additive that increases sand cohesion, one can build taller and steeper structures, maximizing the entertainment value of sand sculpting.

Since the composition of the present invention is intended for use as a toy or craft supply, it also must be non-toxic, water soluble, and environmentally safe. In general, when a substance with adhesive properties becomes dehydrated, it may become a rigid solid, perhaps permanently, as happens with concrete. The composition of the present invention does not remain a rigid solid permanently, but is softened by exposure to water.

SUMMARY OF THE INVENTION

The present invention comprises a sand-based composition which increases the degree of mutual adhesion of sand granules. The composition has the purpose of aiding in the construction of stronger sand sculptures, so as to enhance the entertainment value of sand sculpting. The invention comprises an additive that is mixed with ordinary sand, to produce a gummy compound. This change in texture of wet sand will also increase the entertainment value of sand sculpting. The relative degree of adhesion of the sand granules within the composition is proportional to the concentration of the active ingredient or ingredients. For sand castles on the beach, the concentration of the additive may be very low. When the additive is present in high concentrations, the composition becomes capable of being used to make semi-permanent figures. The composition becomes semi-permanent following dehydration. Regardless of the concentration of the sand additive, the composition will always be dissolved by water.

In its preferred form, the sand additive includes gelatin, salt, colored sand, and white sand. The white sand and/or colored sand can be omitted. The salt makes it feasible to use higher concentrations of gelatin. The colored sand serves as an indicator of the concentration of the additive, when the additive is mixed with ordinary sand. The white sand in the additive simply fills out the additive, making it easier to handle.

In using the sand additive of the present invention, one adds water to the additive, mixing the additive and water to form a homogeneous, sticky paste. Then, the paste is mixed with ordinary sand, again to form a homogeneous composition. The result is a sand-based composition having improved adhesion.

The present invention therefore has the primary object of providing an additive for sand, wherein the additive enhances the adhesion of the sand particles.

The invention has the further object of making it possible to create sand sculptures which are semi-permanent.

The invention has the further object of enhancing the entertainment and/or artistic value of building sand castles and other sand sculptures.

The reader skilled in the art will recognize other objects and advantages of the present invention, from a reading of the following detailed description of the invention, and the appended claims.

DETAILED DESCRIPTION OF THE INVENTION

The present invention comprises an additive which can be combined with ordinary sand, for the purpose of improving the cohesiveness of the ordinary sand.

An ideal recreational sand additive must show a high degree of sand granule adhesion. It must be water soluble and non-toxic. The additive must degrade naturally in the environment, and must provide a visual indication of the concentration of the additive, when the additive has been mixed with ordinary sand. An additive having these properties will be environmentally safe, and will not harm those who handle it. It will also be easy to apply.

The additive of the present invention comprises, in one embodiment, a homogeneous mixture of gelatin, salt, and colored sand. It may also include some white sand, for the purpose of increasing the volume of the additive, thus making the additive easier to handle.

In the preferred embodiment, the additive comprises about 6–10 parts gelatin (by volume), about 0.5–2 parts salt (by volume), about 1–6 parts colored sand (by volume), and about 1–6 parts white sand (by volume).

As an example of an especially preferred combination, one may use 4 parts gelatin, 0.5 parts salt, 3 parts colored sand, and 3 parts white sand. The latter mixture represents a high-concentration mixture. A high-concentration mixture lends itself to the creation of semi-permanent figures for use in arts and crafts, which is a primary field of intended use of the present invention.

The gelatin, when hydrated, provides the primary adhesion effect. The salt, colored sand, and white sand comprise secondary ingredients.

The salt has the purpose of modifying the texture of the additive. Without salt, the additive may become dry and brittle, even after one adds water to the additive before mixing it with sand. One can prevent such embrittlement, without using salt, by reducing the concentration of the gelatin, but only at the expense of reducing the adhesion of the final composition. Thus, using salt makes it more feasible to use higher concentrations of gelatin, and thus to obtain a product having high particle adhesion.

The colored sand has the purpose of providing visual feedback, indicating the relative concentration of the additive when it is mixed with ordinary sand.

If one uses a more dilute mixture of sand and additive, the resulting composition has reduced sand granule adhesion, and the change in texture caused by the additive is reduced. Also, a more dilute composition will have a lighter color, because of the smaller concentration of colored sand. However, such diluted concentrations are still quite effective for building sand sculptures with steep angles.

It should be understood that other adhesion agents may be substituted for the gelatin to cause a significant change in the texture of the sand, and in the degree of sand granule adhesion. Same of these alternative substances are ordinary cooking flour and corn starch. Other substances can be used. Although alternative ingredients offer slightly different textures, levels of adhesion, and color for visual feedback concerning concentration, they should be considered within the scope of the present invention.

It is possible for the sand additive to comprise gelatin alone, or a substitute for gelatin. The additive so made may not indicate concentration, and it will not enjoy the beneficial effects of the salt. One could also use gelatin (or its equivalent) in combination with colored sand and/or white sand. That is, the latter alternative omits the salt. It is also possible to use either or both of white sand and colored sand.

In use, the additive of the present invention is mixed with a small quantity of water. The amount of water is not critical; one must wet the additive just sufficiently that it turns into a sticky paste. The paste so formed is then mixed with ordinary beach sand to form a homogeneous sand-based material from which one can build sand castles or other sand sculptures. When the sand sculpture so made becomes dehydrated, it also becomes a rigid object. But the rigid object will become soft and pliable again when exposed to water.

In the case wherein the additive comprises 4 parts gelatin, 0.5 parts salt, 3 parts colored sand, and 3 parts white sand, and wherein each part equals one teaspoon, the additive can effectively treat up to about a gallon of ordinary wet sand.

The sand additive of the present invention is water-soluble, and non-toxic. Its ingredients will decompose naturally in the environment.

One can add a further ingredient or ingredients to prevent the growth of molds, bacteria, or other organisms, when the additive is stored in a hydrated state. One can also add further ingredients to the additive to give the additive a specific scent. One can also add further ingredients to the additive, to give the additive a carbonated property. The above alternatives are all with the scope of the present invention.

The invention can be modified in various ways. The adhesion agent of the invention is not limited to gelatin. The ratios of the components of the additive can be varied considerably. Any or all of the additional ingredients, mentioned above, could be included. These and other modifications, which will be apparent to those skilled in the art, should be considered within the spirit and scope of the following claims.

What is claimed is:

1. A sand additive comprising:
   a) about 6–10 parts by volume of an adhesion agent selected from the group consisting of gelatin, flour, and starch,
   b) about 0.5–2 parts by volume of salt,
   c) about 1–6 parts by volume of colored sand, and
   d) about 1–6 parts by volume of white sand.

2. The sand additive of claim 1, wherein the adhesion agent comprises gelatin.

3. The sand additive of claim 1, wherein the adhesion agent is selected from the group consisting of flour and corn starch.

4. The sand additive of claim 1, wherein there are four parts of the adhesion agent, 0.5 parts salt, three parts colored sand, and three parts white sand.

5. A sand additive comprising:
   a) about 6–10 parts by volume of an adhesion agent selected from the group consisting of gelatin, flour, and starch,
   b) about 0.5–2 parts by volume of salt, and
   c) about 1–6 parts by volume of colored sand.

6. The sand additive of claim 5, wherein the adhesion agent comprises gelatin.

7. The sand additive of claim 5, wherein the adhesion agent is selected from the group consisting of flour and corn starch.

8. A method of enhancing the adhesion of sand, the method comprising the steps of combining about 6–10 parts by volume gelatin and about 0.5–2 parts by volume salt with sand, adding water, and mixing the gelatin and the sand to form a generally homogeneous and cohesive mixture.

9. The method of claim 8, further comprising the step of adding sand to said mixture.

10. A method of enhancing the adhesion of sand, the method comprising the steps of preparing a mixture of about 6–10 parts by volume gelatin and about 0.5–2 parts by volume salt, adding water to the mixture, combining the mixture with sand to form a generally homogeneous composition.

11. The method of claim 10, wherein colored sand is added to the mixture before the step of adding water.

12. A method of enhancing the adhesion of sand, the method comprising the steps of:
   a) preparing an additive comprising about 6–10 parts by volume of an adhesive agent selected from the group consisting of gelatin, flour, and starch, salt, colored sand, and white sand,
   b) adding water to the additive prepared in step (a) and forming the additive into a cohesive paste, and
   c) combining the paste with ordinary sand, and mixing said ordinary sand with the paste so as to produce a cohesive sand-based composition.

13. A sand additive comprising:
   a) about 6–10 parts by volume of an adhesion agent selected from the group consisting of gelatin, flour, and starch, and
   b) about 1–6 parts by volume of colored sand.

14. A sand additive comprising:
   a) about 6–10 parts by volume of an adhesion agent selected from the group consisting of gelatin, flour, and starch, and
   b) about 1–6 parts by volume of white sand.

15. A method of enhancing the adhesion of sand, the method comprising the steps of:
   a) preparing an additive comprising colored sand, and about 6–10 parts by volume of an adhesive agent selected from the group consisting of gelatin, flour, and starch,
   b) adding water to the additive prepared in step (a) and forming the additive into a cohesive paste, and
   c) combining the paste with ordinary sand, and mixing said ordinary sand with the paste so as to produce a cohesive sand-based composition.

16. A method of enhancing the adhesion of sand, the method comprising the steps of:
   a) preparing an additive comprising white sand, and about 6–10 parts by volume of an adhesive agent selected from the group consisting of gelatin, flour, and starch,
   b) adding water to the additive prepared in step (a) and forming the additive into a cohesive paste, and
   c) combining the paste with ordinary sand, and mixing said ordinary sand with the paste so as to produce a cohesive sand-based composition.

* * * * *